United States Patent
Yanai et al.

(10) Patent No.: US 7,439,300 B2
(45) Date of Patent: Oct. 21, 2008

(54) POLYVINYL ALCOHOL BASED POLYMER AND METHOD OF MANUFACTURING THE SAME

(75) Inventors: Hisamichi Yanai, Kurashiki (JP); Yoshihiro Tokuda, Kurashiki (JP); Jin Tokuyasu, Kurashiki (JP); Kimiko Miyata, Kurashiki (JP); Naoki Fujiwara, Osaka (JP); Takeshi Kusudou, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 390 days.

(21) Appl. No.: 10/937,780

(22) Filed: Sep. 10, 2004

(65) Prior Publication Data

US 2005/0059778 A1    Mar. 17, 2005

(30) Foreign Application Priority Data

Sep. 17, 2003    (JP) .............................. 2003-324828

(51) Int. Cl.
*C08F 8/12* (2006.01)
*C08F 116/06* (2006.01)

(52) U.S. Cl. ........................... 525/62; 524/56; 524/503; 524/556

(58) Field of Classification Search .................. 525/52, 525/62, 503, 557; 524/503, 557
See application file for complete search history.

(56) References Cited

U.S. PATENT DOCUMENTS

| 2,642,419 | A |   | 6/1953  | Waugh et al.   |
|-----------|---|---|---------|----------------|
| 3,296,236 | A |   | 1/1967  | Tanner et al.  |
| 3,487,060 | A |   | 12/1969 | Bristol et al. |
| 3,487,061 | A |   | 12/1969 | Bristol et al. |
| 3,654,247 | A |   | 4/1972  | Bristol et al. |
| 4,401,790 | A |   | 8/1983  | Jung et al.    |
| 5,310,790 | A |   | 5/1994  | Sato et al.    |
| 5,811,488 | A | * | 9/1998  | Narumoto et al. ............. 525/56 |

FOREIGN PATENT DOCUMENTS

| EP | 0 810 254 A1 |   | 12/1997 |
|----|--------------|---|---------|
| EP | 810254 A1    | * | 12/1997 |
| JP | 40-3700      |   | 2/1965  |
| JP | 45-33191     |   | 10/1970 |
| JP | 46-9826      |   | 3/1971  |
| JP | 54-7311      |   | 4/1979  |
| JP | 57-47310     |   | 3/1982  |
| JP | 8-188619     |   | 7/1996  |
| JP | 08-301936    |   | 11/1996 |
| JP | 09-316272    |   | 12/1997 |
| JP | 2000-265026  |   | 9/2000  |
| JP | 2002-53616   |   | 2/2002  |

* cited by examiner

*Primary Examiner*—Randy Gulakowski
*Assistant Examiner*—Michael M Bernshteyn
(74) *Attorney, Agent, or Firm*—Oblon, Spivak, McClelland, Maier & Neustadt, P.C.

(57) ABSTRACT

The present invention provides polyvinyl alcohol based (PVA) whose solubility in water varies with a small temperature change to a sufficiently great degree. In manufacturing a polyvinyl alcohol based polymer by: progressing a transesterification reaction of a polyvinyl ester based polymer with alcohol in a liquid reaction mixture including the polyvinyl ester based polymer, the alcohol, and a basic compound; precipitating the polyvinyl ester based polymer, at least a part of which has been transesterified with the alcohol, out of the liquid reaction mixture; and further progressing the transesterification reaction in the liquid reaction mixture including the polyvinyl ester based polymer that has precipitated, the liquid reaction mixture has a temperature of 75° C. to 150° C. when the polyvinyl ester based polymer, at least a part of which has been transesterified, starts precipitating.

20 Claims, No Drawings

POLYVINYL ALCOHOL BASED POLYMER AND METHOD OF MANUFACTURING THE SAME

BACKGROUND OF THE INVENTION

1. Field of the Invention

The present invention relates generally to a polyvinyl alcohol based polymer and a method of manufacturing the same. More particularly, the present invention relates to a porous polyvinyl alcohol based polymer having low solubility in low-temperature water and a method of manufacturing a polyvinyl alcohol based polymer by allowing a polyvinyl ester based polymer to be subjected to a transesterification reaction (hereinafter also referred to as a "saponification reaction") with alcohol in the presence of a basic compound under specific conditions.

2. Related Background Art

A polyvinyl alcohol based polymer (hereinafter abbreviated as a "PVA" in some cases) that is a typical water-soluble polymer has excellent strength characteristics and film formation ability in addition to the water-solubility. Using such characteristics efficiently, the polyvinyl alcohol based polymer is utilized widely, for example, as a raw material for common vinylon fibers or high strength vinylon fibers, or for fiber processing materials, coating materials for paper, addition agents for paper, adhesives, emulsion stabilizers, films, butyral resins, cosmetics, medical supplies, and ceramic binders.

A PVA with properties of having low solubility in low-temperature water and quick solubility in high-temperature water may be needed depending on the intended use thereof.

Generally, the PVA is used in the form of an aqueous solution. However, when a substrate such as, for instance, paper is to be coated under a condition of a high shear rate, there are problems that, for example, the coating liquid has an increased viscosity to form stripes or is scattered. Hence, it has been studied to make the size of PVA grains smaller to use them in the form of an aqueous slurry. However, when an inorganic substance such as cement is molded by a sheet forming method, the use of the PVA in the form of an aqueous slurry causes problems that, for instance, part of the PVA is eluted into water to decrease the yield thereof in the molded article or the PVA flows out into waste water. Accordingly, there are demands for a PVA having low solubility in low-temperature water. In addition, when the PVA is dissolved in high-temperature water using a continuous dissolution unit such as a jet cooker, it is necessary to dissolve a large amount of PVA in water per unit time and thus there are demands for a PVA having quick solubility. From the viewpoints described above, there are intense demands for a PVA having properties of tending not to form undissolved lumps due to its low solubility in low-temperature water and dissolving in high-temperature water quickly.

Generally, a PVA is manufactured through the transesterification reaction of a polyvinyl ester based polymer (hereinafter abbreviated as a "PVEs" in some cases) with alcohol in the presence of a basic catalyst. Some conventionally known methods of manufacturing a PVA are described as follows.

U.S. Pat. No. 2,642,419 discloses a PVA powder manufacturing method (a so-called belt saponification method) including supplying a mixture consisting of a methanol solution of PVEs whose concentration is 24 wt % to 40 wt % and a methanol solution of sodium hydroxide on a belt conveyer continuously and then pulverizing and drying a gel substance obtained through a methanolysis reaction. The PVA powder obtained by this method dissolves even in low-temperature water. Hence, only the surface of the PVA powder dissolves and they aggregate to be agglomerated. The PVA powder therefore is not suitable for being dissolved in water using, for instance, a continuous dissolution unit. In addition, the PVA powder obtained by this method contain considerable amounts of methanol used in manufacturing it and nonvolatile compounds such as sodium acetate and volatile organic compounds such as carboxylate that are generated through the methanolysis reaction. When a large amount of volatile organic compounds are contained in the PVA powder, the work environment in which the PVA powder is handled deteriorates and further the PVA aqueous solution is required to be subjected to a wastewater treatment. In the case where the PVA powder contains nonvolatile compounds such as sodium acetate, when the PVA powder is used for electrical parts, electronic components, ceramic binders, etc., there is a possibility that some problems such as insulation failure may arise.

JP40(1965)-3700B discloses a PVA powder manufacturing method in which while a PVEs is transesterified with alcohol, a methanol solution of PVEs is supplied intermittently to the transesterification reaction system. When the PVA powder obtained by this method is intended to be dissolved in warm or hot water, undissolved lumps thereof are generated and a uniform aqueous solution therefore cannot be obtained. Hence, this method employs a process in which after the PVA powder is put into low-temperature water, the temperature of the water is raised gradually to allow the PVA powder to dissolve in the water. Accordingly, there is a problem that it takes a long time to dissolve the PVA powder. In addition, since this PVA powder includes a high ratio of fine powder, there is a problem that the fine powder tends to scatter at the time of opening the seal.

JP45(1970)-33191B discloses a PVA powder manufacturing method in which when a PVEs is transesterified with alcohol, a methanol solution of PVEs is supplied continuously at a rate that prevents the concentration of soluble polymers contained in a reaction mixture from exceeding 1 wt %, and a PVA slurry is collected continuously from the reaction mixture. The PVA powder obtained by this method also has the same problems as those described with respect to JP40(1965)-3700B.

JP46(1971)-9826B discloses a PVA powder manufacturing method in which while a methanol solution including a saponification catalyst and a methyl acetate/methanol mixed solvent of partially saponified PVA whose saponification degree is 10 mol % to 40 mol % is supplied continuously to a slurry of a methyl acetate/methanol mixed solvent of PVA whose saponification degree is 97 mol % to 98.5 mol %, at a rate that prevents the concentration of soluble polymers contained in the reaction mixture from exceeding 1 wt %, a PVA slurry is collected continuously from the reaction mixture and is deliquored and dried. The PVA powder obtained by this method also has the same problems as those described with respect to JP40(1965)-3700B.

There are some PVA powder manufacturing methods proposed for solving the problems of undissolved lumps or agglomeration that are caused in dissolving PVA powder in water.

JP54(1979)-7311B discloses a method of manufacturing PVA powder whose solubility in cold water is decreased by heating a PVA with a saponification degree of 93 mol % to 100 mol % in a mixed solvent including methanol, water, etc. at a temperature of at least 50° C. The PVA powder thus obtained, however, may not have improved solubility in high-temperature water. Furthermore, this method employs complicated processes since the PVA is manufactured first and then is heat-treated, and therefore this method requires an additional apparatus for the heat-treatment. Moreover, energy efficiency is low in this method.

JP2002-53616A discloses a method of manufacturing a PVA having improved solubility in water by introducing a specific azo polymerization initiator into a polymer system of vinyl acetate through a supply line while maintaining the azo polymerization initiator at a low temperature, and saponifying polyvinyl acetate obtained through the polymerization of the vinyl acetate. This method allows a PVA with high crystallinity to be obtained but cannot provide a PVA that tends not to dissolve at low temperatures but dissolves at high temperatures quickly. Furthermore, it is difficult to reduce the amount of volatile organic compounds contained in the PVA by drying. When the volatile organic compounds remain in the PVA, the work environment deteriorates. Moreover, this method requires temperature management to be conducted well to keep the line for supplying the polymerization catalyst at low temperature.

JP2000-265026A discloses PVA powder that contains at least 20 wt % of grains whose diameters are in the range of 500 μm to 1000 μm and is excellent in solubility. The PVA powder proposed in JP2000-265026A has a property of tending not to form undissolved lumps when being dissolved in low-temperature water. It, however, takes a long time to dissolve the PVA powder due to the large grain diameters. Thus the PVA powder lacks in practicability. JP8(1996)-301936A discloses a method of heating a PVA, which has been obtained by a well-known method, at a temperature of 140° C. for two hours using no solvent. According to this method, the temperature dependency of the solution property of the PVA powder increases. As in the case of JP54(1979)-7311B, this method, however, employs complicated processes since the PVA that already has been manufactured is heat-treated, and thereby requires an additional apparatus for the heat-treatment. Moreover, energy efficiency is low in this method.

Furthermore, methods of manufacturing a PVA with improved solubility in water also have been proposed.

JP9(1997)-316272A discloses a method of manufacturing porous PVA powder by saponifying a mixed solution including a PVEs and a partially saponified PVA having a saponification degree of 20 mol % to 60 mol %. The PVA powder obtained by this method has been improved in having decreased solubility in low-temperature water. The PVA powder, however, still has room for improvement in solubility in water whose temperature has been raised. In addition, since this method employs the partially saponified PVA, this method requires a preliminary process of saponifying a PVEs.

JP8(1996)-188619A discloses a method of manufacturing PVA fine grains by saponifying a PVEs, with the PVEs being dispersed in a dispersion medium such as a liquid paraffin that does not allow any of the PVEs, PVA, and alcohol to dissolve therein. The PVA fine grains obtained by this method have been improved in having decreased solubility in low-temperature water. There, however, is a problem in that it is difficult to remove volatile organic compounds contained in the PVA fine grains since they are not porous. Furthermore, this method requires the use of a dispersant such as polyvinylpyrrolidone. In order to remove such a dispersant from the PVA, complicated processes are required.

There are intense demands for the PVA that has properties of tending not to form undissolved lumps due to its low solubility in low-temperature water and dissolving in high-temperature water quickly. In the past, a PVA with decreased solubility in low-temperature water has been proposed, but no PVA whose solubility in water varies with a small temperature change to a sufficiently great degree has been obtained yet. Furthermore, conventionally, additional processes or operations are required to suppress the solubility in low-temperature water.

SUMMARY OF THE INVENTION

Hence, an object of the present invention is to provide a PVA whose solubility in water varies with a small temperature change to a sufficiently great degree so that the PVA has, for example, low solubility in low-temperature water but dissolves in high-temperature water quickly. The present invention also is intended to provide a method of manufacturing the PVA.

As a result of keen studies made assiduously, the present inventors found a method that is suitable for manufacturing a PVA with properties of having low solubility in low-temperature water but dissolving in high-temperature water quickly. That is, the present invention provides a method of manufacturing a PVA. The method includes: progressing a transesterification reaction of a PVEs with alcohol in a liquid reaction mixture including the PVEs, the alcohol, and a basic compound; precipitating the PVEs, at least a part of which has been transesterified with the alcohol, out of the liquid reaction mixture; and further progressing the transesterification reaction in the liquid reaction mixture including the PVEs that has precipitated. This method is characterized in that the liquid reaction mixture has a temperature of 75° C. to 150° C. when the PVEs, at least part of which has been transesterified, starts precipitating.

The manufacturing method of the present invention allows the PVA with improved solubility in water to be obtained without employing any additional post-processes (post-operations) such as, for example, one for further heating the PVA obtained through the transesterification. The manufacturing method of the present invention is excellent in manufacture efficiency even when compared to the so-called belt saponification method that requires an operation for polymer pulverization.

Moreover, the manufacturing method of the present invention can provide a PVA whose solubility in water varies with a small temperature change to a greater degree when compared to conventional one. That is, the present invention provides a porous PVA that satisfies one of the following conditions (1) to (4):

(1) its polymerization degree is at least 800 but lower than 8000, its saponification degree is at least 99.0 mol %, and the difference between a temperature at which its temperature-programmed solubility in water becomes lower than 15 wt % and a temperature at which its temperature-programmed solubility in water becomes at least 90 wt % is not more than 10° C.;

(2) its polymerization degree is at least 800 but lower than 8000, its saponification degree is at least 80.0 mol % but lower than 99.0 mol %, and the difference between a temperature at which its temperature-programmed solubility in water becomes lower than 15 wt % and a temperature at which its temperature-programmed solubility in water becomes at least 90 wt % is not more than 20° C.;

(3) its polymerization degree is at least 120 but lower than 800, its saponification degree is at least 95.0 mol %, its temperature-programmed solubility in water is lower than 40 wt % at 50° C., and the difference between a temperature at which its temperature-programmed solubility in water becomes lower than 15 wt % and a temperature at which its temperature-programmed solubility in water becomes at least 90 wt % is not more than 30° C.; and (4) its polymerization degree is at least 120 but lower than 800, its saponification degree is at least 80.0 mol % but lower than 95.0 mol %, and its temperature-programmed solubility in water is lower than 50 wt % at 20° C.

In the above, the "temperature-programmed solubility" denotes a numerical value that is determined by the following formula:

Temperature-Programmed Solubility (wt %)=(S1/S2)× 100, where S1 denotes the amount of a PVA dissolved at a predetermined temperature when a predetermined amount of PVA is put into water whose temperature is 20° C. to prepare a suspension so that the predetermined amount corresponds to 4 wt % of the whole, and then the temperature of the suspension is raised to the predetermined temperature at a rate of 0.8° C./min while the suspension is stirred, and S2 denotes the predetermined amount of the PVA.

The condition (4) described above specifies only the solubility to be obtained at 20° C. However, the PVA having a polymerization degree and a saponification degree approximately within the ranges described in the condition (4) has intrinsically a property of tending to dissolve in water whose temperature is about 40° C. or higher (for instance, its temperature-programmed solubility is at least 90% at 40° C.). Hence, when the temperature-programmed solubility obtained at 20° C. is approximately in the level described above, this PVA has characteristics that its solubility in water varies with a small temperature change to a sufficiently great degree.

The PVA of the present invention is porous and therefore has an advantage that the amount of the volatile organic compound contained therein is small.

The present invention can provide a PVA whose solubility in water varies with a small temperature change to a sufficiently great degree, specifically, for example, a PVA that has poor solubility in low-temperature water but has quick solubility in high-temperature water. This PVA is suitable for various industrial uses in which the PVA is used in the state of having dissolved in water. The present invention also can provide PVA powder that contains a smaller amount of organic volatile components and a smaller amount of nonvolatile components such as, for example, carboxylate originating from the basic catalyst. This PVA is excellent in industrial handling property. The present invention allows a PVA that is excellent in such properties to be manufactured without employing any additional processes.

DETAILED DESCRIPTION OF THE INVENTION

The polyvinyl alcohol based polymer (PVA) of the present invention can be obtained through the transesterification reaction of a polyvinyl ester based polymer (PVEs) with alcohol. The PVEs is obtained through the polymerization of vinyl ester monomers.

Specific examples of the vinyl ester monomers include acetic ester, formic ester, propionic ester, stearic ester, versatic ester, and pivalic ester. These compounds may be used individually or two or more of them may be used in combination. When consideration is given to availability, the use of acetic ester is preferable.

The method of polymerizing vinyl ester monomers to be employed in the present invention can be any one of, for example, a solution polymerization method, a bulk polymerization method, a suspension polymerization method, and an emulsion polymerization method.

In the polymerization of vinyl ester monomers, the vinyl ester monomers and ethyleny unsaturated monomers may be copolymerized. Specific examples of the ethyleny unsaturated monomers include: olefins such as ethylene, propylene, isobutylene, 1-butene, 1-hexene, 1-octene, 1-dodecen, and 1-octadecene; unsaturated acids such as acrylic acid, methacrylic acid, crotonic acid, maleic acid, maleic anhydride, itaconic acid, and itaconic acid anhydride, and salts thereof or monoalkyl or dialkyl ester thereof, nitriles such as acrylonitrile and methacrylonitrile; amides such as acrylic amide, methacrylic amide, and diacetone acrylamide; and olefinsulfonic acids such as ethylenesulfonic acid, allylsulfonic acid, and methallyl sulfonic acid, and salts thereof. Further examples of the ethyleny unsaturated monomers include alkyl vinyl ethers, N-acrylamidemethyltrimethylammonium chloride, allyltrimethylammonium chloride, N-vinylpyrrolidone, N-vinyl-ε-caprolactam, N-vinylacetamide, N-vinylformamide, vinyl chloride, vinylidene chloride, polyoxyalkylene(meth)allyl ether such as polyoxyethylene(meth)allyl ether and polyoxypropylene(meth)allyl ether, polyoxyalkylene (meth)acrylate such as polyoxyethylene(meth)acrylate and polyoxypropylene(meth)acrylate, polyoxyalkylene(meth)acrylamide such as polyoxyethylene(meth)acrylamide and polyoxypropylene(meth)acrylamide, polyoxyethylene(1-(meth)acrylamide-1,1-dimethylpropyl)ester, polyoxyethylene vinyl ether, polyoxypropylene vinyl ether, polyoxyethylene allylamine, polyoxypropylene allylamine, polyoxyethylene vinylamine, and polyoxypropylene vinylamine. These ethyleny unsaturated monomers may be used independently or two or more of them may be used in combination. Preferably, the amount of ethyleny unsaturated monomers to be used is at least 0.01 mol % but less than 25 mol %, more preferably at least 0.02 mol % but less than 20 mol %, on the basis of monomers constituting a PVEs.

The polymerization degree of the PVEs that is used in the present invention is not particularly limited but preferably is in the range of at least 100 but lower than 10000, more preferably in the range of at least 120 but lower than 8000.

In the case where a PVA is intended to be obtained through the transesterification reaction of a PVEs with alcohol, when the saponification degree of the PVA is excessively low, the PVEs whose part has been transesterified is prevented from precipitating out of a liquid reaction mixture. This may make it difficult to manufacture the PVA that is intended to be provided in the present invention. For such a reason, the saponification degree of the PVA of the present invention is preferably 80 mol % to 100 mol %, more preferably 85 mol % to 100 mol %.

The PVA of the present invention has excellent properties of having low solubility in low-temperature water and dissolving in high-temperature water quickly. Especially, its solubility improves rapidly with a smaller temperature change. The solubility of the PVA in water is affected by its polymerization degree and saponification degree. Accordingly, it is appropriate that the excellent solution property of the PVA of the present invention also is described in connection with the polymerization degree and saponification degree.

The PVA of the present invention may be one satisfying the condition (1) that its polymerization degree is at least 800 but lower than 8000, its saponification degree is at least 99.0 mol %, and the difference between a temperature at which its temperature-programmed solubility in water becomes lower than 15 wt %, preferably 12 wt % or lower, and a temperature at which its temperature-programmed solubility in water becomes at least 90 wt %, preferably at least 95 wt %, is not more than 10° C. This PVA is suitable for uses such as, for example, raw materials for polyvinyl acetal, paper coating, adhesives, various binders, raw materials for films, and raw materials for vinylon fibers.

The PVA of the present invention may be one satisfying the condition (2) that its polymerization degree is at least 800 but lower than 8000, its saponification degree is at least 80.0 mol % but lower than 99.0 mol %, and the difference between a temperature at which its temperature-programmed solubility in water becomes lower than 15 wt %, preferably 12 wt % or lower, and a temperature at which its temperature-programmed solubility in water becomes at least 90 wt %, preferably at least 95 wt %, is not more than 20° C., preferably not more than 15° C. This PVA is suitable for uses such as, for example, raw materials for polyvinyl acetal, paper coating, emulsion protective colloid, adhesives, warp fiber pastes, dispersants for suspension polymerization, inorganic dispersants, various binders, raw materials for films, and raw materials for vinylon fibers.

The PVA that satisfies the condition described in (1) or (2) above further can be provided with properties that while its solubility in water whose temperature is quite high is suppressed to a degree that allows its temperature-programmed solubility in water to be lower than 15 wt %, preferably 12 wt % or lower, at 80° C., a mere difference in temperature of 10° C. allows the most part thereof to dissolve in water to a degree that allows its temperature-programmed solubility in water to be at least 90 wt %, preferably at least 95 wt %, at 90° C. When using a PVA that is prevented from dissolving in water until its temperature reaches a considerably high temperature but dissolves quickly when the temperature is raised further, the PVA exhibits excellent solubility in continuous dissolution equipment that is referred to as the so-called jet cooker.

Furthermore, the PVA of the present invention may be one satisfying the condition (3) that its polymerization degree is at least 120 but lower than 800, its saponification degree is at least 95.0 mol %, its temperature-programmed solubility in water is lower than 40 wt %, preferably 20 wt % or lower, at 50° C., and the difference between a temperature at which its temperature-programmed solubility in water becomes lower than 15 wt %, preferably 12 wt % or lower, and a temperature at which its temperature-programmed solubility in water becomes at least 90 wt %, preferably at least 95 wt %, is not more than 30° C., preferably not more than 25° C. This PVA is suitable for uses such as, for example, raw materials for polyvinyl acetal, paper coating, emulsion protective colloid, adhesives, warp fiber pastes, dispersants for suspension polymerization, inorganic dispersants, various binders, raw materials for films, and raw materials for vinylon fibers.

Moreover, the PVA of the present invention may be one satisfying the condition (4) that its polymerization degree is at least 120 but lower than 800, its saponification degree is at least 80.0 mol % but lower than 95.0 mol %, and its temperature-programmed solubility in water is lower than 50 wt % at 20° C. This PVA is suitable for uses such as, for example, raw materials for polyvinyl acetal, paper coating, emulsion protective colloid, adhesives, warp fiber pastes, dispersants for suspension polymerization, inorganic dispersants, various binders, raw materials for films, and raw materials for vinylon fibers.

In the present invention, the temperature-programmed solubility is measured at a programming rate of 0.8° C./min. The solubility is low even in a relatively high temperature range when the programming rate is too high, while the solubility is high in a relatively low temperature range when the programming rate is too low. Accordingly, it becomes difficult to determine the difference in temperature-programmed solubility that results from the differences in properties of the PVA. The programming rate that is used in measuring the temperature-programmed solubility in the present invention is specified in consideration of the above. When the programming rate is in the range of 0.5° C./min to 1° C./min, substantially the same results can be obtained.

The PVA of the present invention also has a property of being porous. Preferably, the PVA of the present invention has pores whose mean diameter is 0.01 μm to 10 μm, and a pore volume of the pores with a mean diameter of 0.01 μm to 10 μm is in the range of 0.2 cc/g to 1.0 cc/g. The pore volume of the pores with a mean diameter of 0.01 μm to 10 μm can be measured by the mercury press-in method using a pore distribution measuring apparatus (a mercury porosimeter).

Since the PVA of the present invention is porous, the amount of volatile organic compounds with a boiling point of 200° C. or lower that remain through the processes of manufacturing the PVA can be reduced. Preferably, the amount of volatile organic compounds with a boiling point of 200° C. or lower that are contained in the PVA of the present invention is 0.5 wt % or less. Examples of the volatile organic compounds include alcohol used for the transesterification reaction and a volatile ester compound that is a byproduct generated by the transesterification reaction. According to the present invention, the volatile organic compounds contained in the PVA can be removed effectively by filtrating or drying the PVA.

According to the present invention, it also is possible to considerably reduce the amount of alkali metal salt that remains in the PVA and originates from the basic compound used for the transesterification reaction of the PVEs with alcohol. The amount of the alkali metal salt that is contained in the PVA of the present invention is, in terms of weight of alkali metal ions, preferably 2500 ppm or less, more preferably 2000 ppm or less. Examples of the alkali metal include sodium, lithium, and potassium.

The PVA of the present invention has preferably an arithmetic mean grain diameter of 100 μm to 2000 μm, more preferably 150 μm to 1500 μm. It is preferable that the PVA of the present invention has a bulk specific gravity of 0.20 to 0.60.

In the manufacturing method of the present invention, when the temperature at which a precipitation (the PVEs, at least part of which has been transesterified) is formed out of the liquid reaction mixture is lower than 75° C., the PVA obtained thereby cannot have low solubility in low-temperature water and tends to form undissolved lumps. On the other hand, when the temperature exceeds 150° C., the PVA obtained thereby cannot be porous. In addition, when the temperature exceeds 150° C., some problems are caused including that a large amount of catalyst is required to obtain a suitable saponification degree because of quick deactivation of the catalyst and that coloring is observed.

In the method of the present invention, to be precise, the temperature of the liquid reaction mixture at which the polymer (PVEs), at least part of which has been transesterified, starts precipitating denotes the temperature that causes the state from a stage in which the transesterification reaction of the PVEs that has dissolved in the liquid reaction mixture has progressed somewhat, and the polymer that has been transesterified is gelled to be insolubilized and thereby starts undergoing phase separation out of the liquid reaction mixture, to a stage in which the gelled insoluble matters then are formed in the liquid reaction mixture as grains with diameters of the order of several ten microns. More specifically, it denotes the temperature that causes the state from a stage in which the liquid reaction mixture that has been uniformly transparent starts becoming cloudy due to the gelled matters (insoluble matters) produced through the phase separation to a stage in which mainly gelled matters with grain diameters of about 20 μm to 50 μm are formed.

In the method of the present invention, the transesterification reaction of the PVEs with alcohol can be considered to be divided into three stages including: (i) a stage from the start of progress of the transesterification reaction to the precipitation of the polymer (PVEs), at least part of which has been transesterified, out of the liquid reaction mixture; (ii) a stage in which a precipitation (the PVEs, at least part of which has been transesterified) appears out of the liquid reaction mixture; and (iii) a stage in which the transesterification reaction further progresses in the liquid reaction mixture including the precipitation.

In the method of the present invention, it is preferable that the liquid reaction mixture has a temperature of 75° C. to 150° C. in the stage (ii) and has a temperature of 40° C. to 165° C. in the stage (i). In the stage (iii), the grain diameter of the precipitation increases and the PVA to be obtained finally is formed. Preferably, the liquid reaction mixture has a temperature of 75° C. to 150° C. in the stage (iii).

The transesterification reaction of the PVEs with alcohol can be carried out by, for example, a batch method using one reaction vessel. In this case, the transesterification reaction including the three stages (i), (ii), and (iii) described above may be carried out progressively as a series of reactions. Another method also can be carried out as follows. That is, for example, using a tube-type reactor with its inside being divided into three reaction zones, the three stages (i), (ii), and (iii) of the transesterification reaction described above may be carried out in the three reaction zones, respectively. A further method also may be employed in which using a plurality of reaction vessels, the three stages (i), (ii), and (iii) of the transesterification reaction described above may be carried out progressively in the respective reaction vessels step by step.

The method of the present invention may be carried out while a solution of unreacted PVEs or a solution of PVEs-PVA may be added continuously or intermittently to the liquid reaction mixture including the precipitation of PVEs (PVEs-PVA) whose part has been transesterified. In this case, a part of the unreacted PVEs or PVEs-PVA added to the liquid reaction mixture is transesterified therein and then is gelled to be insolubilized, and thereby precipitation with a grain diameter of about 20 μm to 50 μm is formed. In addition, the rest of the unreacted PVEs or PVEs-PVA added to the liquid reaction mixture is transesterified on the grains of PVEs-PVA that already have precipitated and thereby contributes to the growth of the grains. This kind of method may include a period in which the stages (i) to (iii) progress simultaneously. In this case, however, in order to provide all PVA to be manufactured with favorable characteristics, it is advantageous that the temperature of the liquid reaction mixture is set within the range described above as long as the stage (ii) is progressing.

In the method of the present invention, it is preferable that the transesterification degree A (a saponification degree; mol %) of the PVEs and the temperature T(° C.) of the liquid reaction mixture have the relationship that satisfies the following formula:

$$145+20\times\exp(-0.05\times A) \geqq T \geqq 85-45\times\exp(-0.05\times A).$$

In the above, "A" denotes the transesterification degree of the entire PVEs that has dissolved or has precipitated in the liquid reaction mixture.

The alcohol to be used in the method of the present invention is not particularly limited. It, however, is preferable that the alcohol can serve as both a reactant and a reaction solvent and can dissolve the PVEs uniformly. Specific examples of the alcohol that satisfies these conditions include monohydric primary alcohols with a carbon number of 1 to 5, and polyhydric alcohols including primary alcohols with a carbon number of 2 to 4. Examples of the monohydric primary alcohols with a carbon number of 1 to 5 include methanol, ethanol, n-propanol, n-butanol, i-butanol, n-amyl alcohol, and i-amyl alcohol. Examples of the polyhydric alcohols including primary alcohols with a carbon number of 2 to 4 include ethylene glycol, 1,2-propanediol, 1,3-propanediol, 2-methyl-1,3-propanediol, 1,2-butanediol, 1,3-butanediol, and 1,4-butanediol. From the viewpoints of the reaction rate, the solubility of the PVEs, etc, it is preferable that the alcohol contains methanol or ethanol, particularly methanol. These alcohols may be used individually or two or more of them may be used in combination.

In the method of the present invention, the alcohol to be used for the transesterification reaction of the PVEs also can serve as a reaction solvent. An additional reaction solvent, however, may be used besides the alcohol. Preferably, the reaction solvent to be used for this purpose has low reactivity with the PVA and the basic compound described later and can dissolve the PVEs uniformly. Especially, when a PVA with a polymerization degree of 800 or lower and a saponification degree of 80% to 95% is intended to be manufactured, a part (at least 2% but less than 30%) of the PVA obtained by the transesterification reaction may remain in the alcohol used for the transesterification reaction in an unprecipitated state in some cases. There are some cases where it may be advantageous that a reaction solvent other than the alcohol is used for the purpose of carrying out the transesterification reaction without allowing the PVA that has not precipitated to remain in the alcohol. From the above-mentioned points of view, specific examples of the reaction solvent that can be used include ethyl ether, isopropyl ether, tetrahydrofuran, 1,4-dioxane, ethylene glycol dimethyl ether, N,N-dimethylformamide, N,N-dimethylacetamide, dimethyl sulfoxide, sulfolane, N-methylpyrrolidone, methyl formate, ethyl formate, propyl formate, isopropyl formate, butyl formate, pentyl formate, methyl acetate, ethyl acetate, propyl acetate, isopropyl acetate, butyl acetate, pentyl acetate, methyl propionate, ethyl propionate, propyl propionate, isopropyl propionate, butyl propionate, and pentyl propionate. These reaction solvents can be used individually or two or more of them may be used in combination. When the transesterification reaction of the PVEs with alcohol is to be carried out using such a reaction solvent, the reaction solvent may be recovered after the transesterification reaction. A preferable amount of the reaction solvent to be used is at least 0.01 wt % but less than 50 wt % in terms of a ratio thereof to the weight of the liquid reaction mixture.

It is recommended to use, as the reaction solvent, an ester compound that is a reaction product produced by the reaction between part of carboxylic acid of the PVEs and alcohol used for the transesterification reaction. This is because it is not necessary to recover reaction solvent after the transesterification reaction and thereby the process required for recovering it can be omitted. Specific examples of such an ester compound include methyl formate, ethyl formate, propyl formate, isopropyl formate, butyl formate, pentyl formate, methyl acetate, ethyl acetate, propyl acetate, isopropyl acetate, butyl acetate, pentyl acetate, methyl propionate, ethyl propionate, propyl propionate, isopropyl propionate, butyl propionate, and pentyl propionate. Among them, methyl acetate and ethyl acetate are preferable, and methyl acetate is particularly preferable. Those ester compounds can be used individually or two or more of them may be used in combination. A preferable amount of the ester compound to be used is at least 0.01 wt % but less than 50 wt % in terms of a ratio thereof to the weight of the liquid reaction mixture.

In the method of the present invention, it is preferable that the part of the liquid reaction mixture other than the polyvinyl alcohol based polymer and polyvinyl ester based polymer that have dissolved in or have precipitated out of the liquid reaction mixture has a dielectric constant of 20 to 35 at 20° C. while the transesterification reaction is progressing. The solution part of the liquid reaction mixture other than the polymers consists mainly of, for example, alcohol, an ester compound generated through the transesterification reaction between the alcohol and the carboxylic acid part of the PVEs, and the reaction solvent that is used as required. In addition, the solution part includes, for example, the basic compound to be described later and water, as trace amounts of components. If this solution part has a dielectric constant of smaller than 20, the PVA has a small mean grain diameter and thereby a large amount of fine powder tends to be produced. On the other hand, when the solution part has a dielectric constant of larger than 35, the PVA tends to have pores with smaller volumes.

In the method of the present invention, it is preferable that the molar amount of alcohol to be used for the transesterification reaction of the PVEs is at least three times the molar amount of ester groups present in the PVEs. The upper limit of the molar amount of alcohol is preferably 200 times, particularly 50 times the molar amount of ester groups present in the PVEs. When it is less than three times, it becomes difficult to progress the reaction to obtain a desired saponification degree. On the other hand, a molar amount of alcohol exceeding 200 times deteriorates the productivity and requires work and cost for separating and recovering an excess amount of alcohol.

The basic compound can be one that conventionally has been used for the transesterification reaction between a PVEs and alcohol. Examples of such a basic compound include: alkali metal hydroxides such as sodium hydroxide, potassium hydroxide, and lithium hydroxide; alkali metal alcoholate such as sodium methylate and t-butoxypotassium; strongly basic amines such as 1.8-diazabicyclo[5,4,0]undecene-7 (DBU) and ammonia; alkali metal carbonate, and alkali metal hydrogencarbonate. Among them, from the viewpoints of handling property and availability, sodium hydroxide, potassium hydroxide, lithium hydroxide, sodium methoxide, potassium methoxide, and sodium ethoxide are preferable and sodium hydroxide and sodium methoxide are particularly preferable. These basic compounds can be used individually or two or more of them may be used in combination.

The molar amount of the basic compound to be used is preferably 0.0005 to 0.2 times, more preferably 0.001 to 0.1 times the molar amount of ester groups present in the PVEs. When the molar amount of the basic compound used is less than 0.0005 times the molar amount of ester groups present in the PVEs, a sufficiently high reaction rate cannot be obtained and thereby it may be difficult to manufacture a PVA with a target saponification degree in some cases. On the other hand, the use of the basic compound whose molar amount exceeds 0.2 times the molar amount of ester groups present in the PVEs results in disadvantage in cost due to the increased amount of the basic compound to be used, or may cause coloring of a PVA to be obtained. An additional amount of basic compound can be added during the transesterification reaction.

In the method of the present invention, from the viewpoint of preventing the reaction activity of the basic compound from deteriorating due to the effect of water, the amount of water contained in the liquid reaction mixture is preferably 2 wt % or less, more preferably 0.5 wt % or less.

When it is intended to manufacture a PVA with a saponification degree of 80 mol % to 95 mol %, additional water may be added to the reaction system for preventing the transesterification reaction from progressing excessively. In this case, however, the amount of water contained in the liquid reaction mixture is preferably 2 wt % or less, more preferably 0.5 wt % or less. When the amount of water exceeds 2 wt %, it is necessary to use a large amount of basic compound for the transesterification reaction, which is uneconomical, and it may cause coloring of the PVA.

The temperature (75° C. to 150° C.) at which the transesterification reaction is carried out in the stage where a precipitation is formed in the liquid reaction mixture may be higher than the boiling point under ordinary pressure of alcohol depending on the type of the alcohol. In such a case, it is recommended to use an apparatus with a pressure-resistant structure to carry out the transesterification reaction. When an apparatus with a pressure-resistant structure is used for carrying out the transesterification reaction, the pressure inside the apparatus may be set suitably within a range in which no difficulties are caused in carrying out the transesterification reaction, with considerations given to the temperature to be set and vapor pressure of, for example, ester compounds to be generated and alcohol that is contained in the liquid reaction mixture.

In the method of the present invention, the transesterification reaction may be carried out in an atmosphere of gas that is inactive with respect to, for example, the PVEs, basic compound, alcohol, and reaction solvent. The inactive gas is not particularly limited, but specific examples thereof include nitrogen, helium, argon, and hydrogen. Among them, nitrogen is most preferable due to its low cost and its availability.

In the present invention, as the transesterification reaction progresses, the PVEs that has dissolved in the liquid reaction mixture becomes a PVA that is insoluble in the alcohol to precipitate and form grains. It is desirable that the PVA grains have a sharp grain size distribution. In order to obtain PVA grains with a sharp grain size distribution, it is advantageous that the transesterification reaction is carried out while the liquid reaction mixture is stirred. The liquid reaction mixture often has high viscosity although it also depends on the polymerization degree of the PVEs that is contained in the liquid reaction mixture. Hence, from such a viewpoint, similarly it is advantageous that the transesterification reaction is carried out while the liquid reaction mixture is stirred. Specific examples of the reactor that is suitable for the transesterification reaction include a reaction vessel provided with a stirrer, a twin screw extruder, and a line mixer. These reactors may have a pressure-resistant structure.

In the method of the present invention, the transesterification reaction can be carried out by using any one of well-known reaction methods such as, for example, a batch method, a continuous process, and a semi-continuous process. In any cases of using those reaction methods, the transesterification reaction can be carried out through a plurality of reaction processes. In this case, it is enough to satisfy the condition that the temperature of the liquid reaction mixture in the process including causing a precipitation to appear out of the liquid reaction mixture is at least 75° C. but lower than 150° C.

When the transesterification reaction is carried out by the batch method, the reaction method can be any method. Examples of the reaction method include: a method in which alcohol and a PVEs as well as a reaction solvent and water as required are put, at ordinary temperature, into a reaction vessel provided with a stirrer, then the inside of the reaction system is set at a predetermined temperature while the stirrer is set at a predetermined stirring speed, and thereafter a basic compound is added thereto to start the transesterification reaction; and a method in which after alcohol, a PVEs, and a basic compound as well as a reaction solvent and water as required are put, at ordinary temperature, into a reaction vessel provided with a stirrer, the inside of the reaction system is set at a predetermined temperature while the stirrer is set at a predetermined stirring speed, and then the reaction is started.

Generally, the reaction time is one minute to ten hours, preferably two minutes to five hours although it also depends on the concentration of the PVEs contained in the liquid reaction mixture, the reaction temperature, the amount of the basic compound to be used, and the amount of water contained in the liquid reaction mixture.

After the completion of the transesterification reaction, PVA grains produced thereby can be collected directly. Alternatively, an acidic compound such as formic acid, acetic acid, propionic acid, phenol, maleic acid, fumaric acid, benzoic acid, hydrochloric acid, sulfuric acid, nitric acid, or trifluoroacetic acid may be added to allow the basic compound to lose its reaction activity, and then the suspension containing PVA grains may be collected. An acidic compound may be added to stop the progress of the transesterification reaction. When using the acidic compound, the molar amount thereof is preferably 0.01 to 10 times, more preferably 0.1 to 5 times the molar amount of the basic compound to be used.

When the transesterification reaction is carried out by the continuous process, any reaction method can be employed. Examples of the reaction method include: a method in which a PVEs, alcohol, and a basic compound as well as a reaction solvent and water as required are fed continuously into a reaction vessel and a suspension containing PVA grains is collected continuously from the liquid-phase portion; a method in which at least two reaction vessels are connected to each other in series, a PVEs, alcohol, and a basic compound as well as a reaction solvent and water as required are fed continuously into a first reaction vessel, the reaction is allowed to progress to a state where a part of the PVEs has been transesterified, the liquid reaction mixture containing the PVEs whose part has been transesterified is forwarded continuously to a second reaction vessel and further reaction vessels, the reaction is allowed to progress in the last vessel until the PVA has a desired saponification degree, and thereafter, the liquid reaction mixture containing the PVA grains produced thereby is collected continuously; and a method in which after the transesterification reaction is carried out by a well-known method, the transesterification reaction is conducted in the last stage of the reaction according to the method of the present invention.

In the same manner as in the case where the transesterification reaction is carried out by the batch method, it also is possible to add an acidic compound to allow the basic compound to lose its reaction activity and then to collect the suspension containing PVA grains. When using the acidic compound, the molar amount thereof is preferably 0.01 to 10 times, more preferably 0.1 to 5 times the molar amount of the basic compound to be used.

When the transesterification reaction is carried out by the semi-continuous process, any reaction method can be used. Examples of the reaction method include: a method in which a part or the whole amount of alcohol and basic compound as well as reaction solvent and water as required is put into a reaction vessel provided with a stirrer, the inside of the reaction system is set at a predetermined temperature while the stirrer is set at a predetermined stirring speed, and then an alcohol solution containing a PVEs and the rest of the basic compound, reaction solvent, and water are fed into the reaction vessel continuously or intermittently; and a method in which a part or the whole amount of alcohol solution containing a PVEs as well as reaction solvent and water as required is put into a reaction vessel provided with a stirrer beforehand, the inside of the reaction system is set at a predetermined temperature while the stirrer is set at a predetermined stirring speed, and then a basic compound and the rest of the alcohol solution containing a PVEs, reaction solvent, and water are fed into the reaction vessel continuously or intermittently.

When the transesterification reaction of a PVEs with alcohol is carried out by the belt saponification method, which is one of the conventional methods, an operation of pulverizing the PVA obtained through the reaction is required. On the other hand, in the method of the present invention, granular PVA grains can be obtained simply by drying the suspension containing the PVA collected from the reaction vessel after the suspension is filtered, and therefore the pulverization process can be omitted. The suspension containing the PVA can be filtrated using, for example, a Nutsche filter, a leaf filter, a batch-type centrifugal separator, a filter press, a tray filter, a belt filter, a belt press filter, a screw decanter, a screw press machine, a liquid cyclone, or a rotary filter. Furthermore, the PVA grains obtained after the filtration can be dried using, for example, a chamber dryer, a tunnel or band dryer, a rotary dryer, a fluidized-bed dryer, a multistage disk dryer, a flash dryer, a drum dryer, a cylinder dryer, or a vibration dryer.

Hereinafter, the present invention is described further in detail using examples but is not limited to the examples. In the following examples, the unit "%" denotes a percentage expressed on a weight basis unless otherwise specified. First, methods of determining characteristics are described.

Measurement of Content of Volatile Organic Compound

First, 0.5 g of PVA obtained by drying, 10 mg of dioxane to serve as the internal standard, and 49.5 g of ion-exchange water were mixed together uniformly to prepare a 1-wt % PVA solution. The solution thus obtained was analyzed directly by gas chromatography and thereby the amount of the volatile organic compound contained therein was determined (the column used herein: HR-20 (manufactured by SHINWA CHEMICAL INDUSTRIES, LTD.); the temperature program employed herein: 50° C. (maintained for one minute)→raising at 5° C./min →100° C. (constant); the detector used herein: FID/flame ionization detector).

Measurement of Pore Volume

The pore volume was measured by the mercury press-in method using a porosimeter (Autopore 9200; manufactured by Shimadzu Corporation).

Measurement of Mean Grain Diameter

With sieves according to Japanese Industrial Standard (JIS) whose mesh sizes were 3350 µm, 2000 µm, 1000 µm, 600 µm, 425 µm, 250 µm, 100 µm, and 45 µm being stacked together sequentially from the top, a PVA whose weight had been measured was put into the top mesh and was sieved out in a shaker for 20 minutes. Thereafter, weight of the PVA that stayed on each sieve was measured. The mean value of the mesh sizes of the sieve on which the PVA stayed and one located directly thereabove was used as a mean mesh size. The mean grain diameter then was calculated from the arithmetical mean of the mean mesh size and the weight.

Measurement of Solubility in Water

After 288 g of distilled water was put in a 500-ml separable flask provided with a stirrer, a reflux condenser, and a thermometer, the flask was placed in an oil bath. While the distilled water was stirred at 300 rpm, the water temperature was adjusted to 20° C. When the temperature of the distilled water became constant, 12 g of PVA was added thereto while the distilled water was stirred. Then the internal temperature was raised constantly at a rate of 0.8° C./min. About 5 g of fluid contained in the separable flask were collected carefully every 10° C. or, suitably, every 5° C. of temperature rise from the initial temperature of 20° C., with fine powder being prevented from being sucked up. Thereafter, the weight of the fluid was measured. The PVA contained in the liquid thus obtained was quantified by the gravimetric method (i.e. the solution was evaporated to dryness and then the resultant solid compound was measured). The amount S1 of the PVA that had dissolved in the aqueous solution inside the separable flask was calculated from the weight of the liquid collected from the flask and the weight of the PVA that was contained in the liquid. The solubility of the PVA in water obtained at the temperature was determined by the following formula:

Solubility (wt %)=$S1/S2$, where S2 denotes the amount of the PVA that was added initially.

Measurement of Dielectric Constant

The composition of a solution part of the liquid reaction mixture other than the polymers was analyzed, and then a model composition solution including no polymers was prepared. The dielectric constant of this model composition solution at 20° C. was measured using a dielectric constant measurement apparatus (Impedance Analyzer 4192A, manufactured by Hewlett Packard).

EXAMPLE 1

First, 86 g of polyvinyl acetate (PVAc) with a polymerization degree of 2000 and 316 g of methanol were put into a 1-liter glass autoclave provided with an electromagnetic stirrer. The inside of the autoclave was visually observable. The water content of this liquid mixture was measured and as a result, was 760 ppm. The content present in a vapor phase was substituted with 0.5-MPa nitrogen three times. The inside then was brought back to the atmospheric pressure. Thereafter, the temperature of the container was raised while the liquid mixture was stirred at 1000 rpm to be mixed up. Thus the temperature inside the container (that is equal to the temperature of the liquid mixture) was set at 55° C.

While the liquid mixture was stirred continuously (until the reaction was stopped), 4 g of methanol containing 0.162 g of sodium methoxide (3 mmol, which is 0.003 times the molar amount of ester groups included in the PVAc) were introduced into the autoclave under pressure using nitrogen. Thus a liquid reaction mixture was prepared (the molar amount of the methanol that had been introduced into the autoclave under pressure was ten times the molar amount of ester groups included in the PVAc). After the introduction of sodium methoxide, the transesterification reaction (a saponification reaction) was allowed to progress in the liquid reaction mixture while the temperature inside the autoclave was raised at about 10° C./min. When the temperature inside the autoclave reached 110° C. six minutes after the introduction of sodium methoxide, the liquid reaction mixture began to become cloudy. It was confirmed separately that PVAc (granular PVAc, a part of which had been saponified) having a grain diameter of about 20 µm to 50 µm had precipitated in the liquid reaction mixture that had began to become cloudy.

Further, the temperature was raised continuously for two minutes. When the internal temperature reached 125° C., the reaction was allowed to continue for 15 minutes while the temperature was kept constant. Then 0.5 g (8.3 mmol) of acetic acid was introduced into the autoclave under pressure to stop the reaction. After the container was cooled, the pressure inside the container was released. The liquid portion of the liquid reaction mixture was analyzed and thereby it was found that methyl acetate accounted for 20 wt % of the liquid portion. The dielectric constant of the liquid reaction mixture was 32 at the time the reaction started and 26 at the time the reaction was stopped.

The liquid reaction mixture (PVA suspension) obtained after the reaction was stopped was sampled and was subjected to suction filtration using a water aspirator. Thus wet granular PVA was obtained. The granules thus obtained were dried at 80° C. for eight hours. As a result, 43.8 g of white, porous, and granular PVA were obtained. The saponification degree of the PVA was measured and as a result, was 99.32%.

The amount of volatile organic compounds (the total amount of methanol, methyl acetate, and acetic acid) contained in the granules obtained above was determined to be a trace amount (0.1 wt % or less in the dried PVA). The amount of alkali metal ions contained in the granules obtained above was determined. As a result, 350 ppm of sodium were contained in the dried PVA but no other alkali metal ions were detected. The pore volume of the granules obtained above was measured and thereby it was found that the pore volume of the granules with a mean diameter of 0.01 µm to 10 µm was 0.82 cc/g. The bulk specific gravity of the granules obtained above was determined to be 0.38 g/cc. The arithmetic mean grain size of the granules was determined to be 855 µm.

TABLE 1

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.0 | 0.2 | 0.2 | 0.2 | 0.2 | 0.5 | 6.7 | 38 | 100 |

EXAMPLE 2

A white, porous, and granular PVA was obtained in the same manner as in Example 1. The amount of sodium methoxide, however, was 0.108 g (2 mmol, which is 0.002 times the molar amount of ester groups included in the PVAc) in this example. The temperature inside the autoclave was kept at 125° C. from the time the sodium methoxide was introduced thereinto under pressure (i.e. the reaction started). This temperature was maintained from the time the transesterification reaction started until the reaction was stopped by the introduction of acetic acid under pressure through the stage where the liquid reaction mixture began to become cloudy three minutes after the introduction of the sodium methoxide. The acetic acid was introduced under pressure 20 minutes after the reaction started. After the liquid reaction mixture was dried, 43.5 g of PVA were obtained. The concentration of methyl acetate measured after the reaction was stopped was the same as that obtained in Example 1.

The granular PVA thus obtained was subjected to the same measurements of characteristics as in Example 1. Table 2 shows its temperature-programmed solubility. The conditions under which the PVA was manufactured and the characteristics of the PVA are shown in Tables 20 and 21, respectively.

TABLE 2

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.0 | 0.1 | 0.2 | 0.2 | 0.3 | 0.9 | 9.5 | 42 | 100 |

EXAMPLE 3

A white, porous, and granular PVA was obtained in the same manner as in Example 1. The amount of sodium methoxide, however, was 0.27 g (5 mmol, which is 0.005 times the molar amount of ester groups included in the PVAc) in this example. The temperature inside the autoclave was kept not at 55° C. but at 35° C. when the sodium methoxide was introduced thereinto under pressure. From this temperature, the temperature was raised at the same rate (about 10° C./min) as in Example 1. As a result, the liquid reaction mixture became cloudy at 90° C. six minutes after the introduction of the sodium methoxide. Thereafter, as in Example 1, the temperature was raised to 125° C. and the reaction was continued for 15 minutes. Acetic acid then was introduced thereinto under pressure to stop the reaction. In this example, the amount of the acetic acid was 0.75 g (12.5 mmol). After the liquid reaction mixture was dried, 43.6 g of PVA were obtained. The concentration of methyl acetate measured after the reaction was stopped was the same as that obtained in Example 1.

The granular PVA thus obtained was subjected to the same measurements of characteristics as in Example 1. Table 3 shows its temperature-programmed solubility. The conditions under which the PVA was manufactured and the characteristics of the PVA are shown in Tables 20 and 21, respectively.

TABLE 3

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.0 | 0.2 | 0.3 | 0.4 | 0.6 | 1.5 | 11.5 | 57 | 100 |

EXAMPLE 4

A white, porous, and granular PVA was obtained in the same manner as in Example 1. The temperature inside the autoclave, however, was kept not at 55° C. but at 168° C. when the sodium methoxide was introduced thereinto under pressure. From this temperature, the autoclave was cooled using an oil bath. Consequently, the liquid reaction mixture became cloudy at 135° C. one minute after the introduction of the sodium methoxide. Thereafter, the temperature was maintained at 135° C. and the reaction was continued for 15 minutes. Acetic acid then was introduced thereinto under pressure to stop the reaction. After the liquid reaction mixture was dried, 43.2 g of PVA were obtained. The concentration of methyl acetate measured after the reaction was stopped was the same as that obtained in Example 1.

The granular PVA thus obtained was subjected to the same measurements of characteristics as in Example 1. Table 4 shows its temperature-programmed solubility. The conditions under which the PVA was manufactured and the characteristics of the PVA are shown in Tables 20 and 21, respectively.

TABLE 4

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.0 | 0.2 | 0.2 | 0.2 | 0.2 | 0.4 | 9.7 | 45 | 100 |

EXAMPLE 5

A white, porous, and granular PVA was obtained in the same manner as in Example 1. However, the liquid reaction mixture became cloudy at 110° C. six minutes after the introduction of the sodium methoxide. The autoclave then was cooled using an oil bath. The temperature inside the autoclave reached 70° C. seven minutes after the start of cooling and was kept constant at 70° C. Thereafter, the reaction further was continued for 15 minutes. Acetic acid then was introduced thereinto under pressure to stop the reaction. After the liquid reaction mixture was dried, 43.2 g of PVA were obtained. The concentration of methyl acetate measured after the reaction was stopped was the same as that obtained in Example 1.

The granular PVA thus obtained was subjected to the same measurements of characteristics as in Example 1. Table 5 shows its temperature-programmed solubility. The conditions under which the PVA was manufactured and the characteristics of the PVA are shown in Tables 20 and 21, respectively.

TABLE 5

| Temperature | 20 | 30 | 40 | 50 | 60 | 70 | 80 | 85 | 90 |
|---|---|---|---|---|---|---|---|---|---|
| Amount of Dissolved PVA (wt %) | 0.0 | 0.2 | 0.2 | 0.4 | 0.5 | 1.1 | 11.8 | 65 | 100 |

EXAMPLE 6

A white, porous, and granular PVA was obtained in the same manner as in Example 1. However, the liquid reaction mixture became cloudy at 110° C. six minutes after the introduction of the sodium methoxide. Thereafter, the temperature inside the autoclave was raised for an extended period of time, specifically five minutes, to reach 155° C. In this state, the reaction further was continued for 15 minutes. Acetic acid then was introduced thereinto under pressure to stop the reaction. After the liquid reaction mixture was dried, 43.5 g of PVA were obtained. The concentration of methyl acetate measured after the reaction was stopped was the same as that obtained in Example 1.

The granular PVA thus obtained was subjected to the same measurements of characteristics as in Example 1. Table 6 shows its temperature-programmed solubility. The conditions under which the PVA was manufactured and the characteristics of the PVA are shown in Tables 20 and 21, respectively.

TABLE 6

| Temperature (° C.) | 20 | 30 | 40 | 50 | 60 | 70 | 80 | 85 | 90 |
|---|---|---|---|---|---|---|---|---|---|

TABLE 6-continued

| Amount of Dissolved PVA (wt %) | 0.0 | 0.2 | 0.2 | 0.3 | 0.3 | 0.7 | 8.9 | 44 | 100 |

COMPARATIVE EXAMPLE 1

A white, porous, and granular PVA was obtained in the same manner as in Example 1. The amount of sodium methoxide, however, was 1.62 g (30 mmol, which is 0.03 times the molar amount of ester groups included in the PVAc). The temperature was raised at the same rate (about 10° C./min) as in Example 1. Consequently, the liquid reaction mixture became cloudy at 70° C. two minutes after the introduction of the sodium methoxide. Thereafter, as in Example 1, the temperature was raised to 125° C. and the reaction was continued for 15 minutes. Acetic acid then was introduced thereinto under pressure to stop the reaction. In this comparative example, the amount of the acetic acid was 5 g (83 mmol). After the liquid reaction mixture was dried, 43.4 g of PVA were obtained. The concentration of methyl acetate measured after the reaction was stopped was the same as that obtained in Example 1.

The granular PVA thus obtained was subjected to the same measurements of characteristics as in Example 1. Table 7 shows its temperature-programmed solubility. The conditions under which the PVA was manufactured and the characteristics of the PVA are shown in Tables 20 and 21, respectively.

TABLE 7

| Temperature (° C.) | 20 | 30 | 40 | 50 | 60 | 70 | 80 | 90 |
|---|---|---|---|---|---|---|---|---|
| Amount of Dissolved PVA (wt %) | 0.0 | 0.2 | 0.2 | 0.5 | 4.5 | 16.2 | 21.5 | 100 |

COMPARATIVE EXAMPLE 2

A PVA was obtained in the same manner as in Example 1. However, the temperature inside the autoclave was kept at 155° C. from the time the transesterification reaction was started by the introduction of sodium methoxide under pressure until the reaction was stopped by the introduction of acetic acid under pressure through the stage where the liquid reaction mixture began to become cloudy one minute after the introduction of sodium methoxide. The acetic acid was introduced 15 minutes after the reaction started.

The PVA thus generated had adhered to the stirrer and no granular PVA was obtained. The PVA was collected and then was dried under the same conditions as in Example 1. Since no granules were obtained, its temperature-programmed solubility, bulk specific gravity, and mean grain diameter were not measured but its characteristics other than those were measured in the same manner as in Example 1. The concentration of methyl acetate measured after the reaction was stopped was the same as that obtained in Example 1. The conditions under which the PVA was manufactured and the characteristics of the PVA are shown in Tables 20 and 21, respectively.

EXAMPLE 7

A white, porous, and granular PVA was obtained in the same manner as in Example 1. However, 196 g of methanol and 120 g of methyl acetate together with 86 g of PVAc having a polymerization degree of 2000 were put into the autoclave. The addition of the methyl acetate decreases the dielectric constant of the liquid mixture. The water content of this liquid mixture was 600 ppm. After the sodium methoxide was introduced into the autoclave under pressure, the molar amount of the methanol contained in this liquid mixture was 6.3 times the molar amount of ester groups included in the PVAc. The temperature was raised at the same rate (about 10° C./min) as in Example 1. Consequently, the liquid reaction mixture became cloudy at 120° C. seven minutes after the introduction of the sodium methoxide. Thereafter, as in Example 1, the temperature was raised to 125° C. and the reaction was continued for 15 minutes. After the liquid reaction mixture was dried, 43.6 g of PVA were obtained. The liquid reaction mixture had a dielectric constant of 23 at the time the reaction started and that of 18 at the time the reaction was stopped. The methyl acetate accounted for 54 wt % of the liquid portion.

The granular PVA thus obtained was subjected to the same measurements of characteristics as in Example 1. Table 8 shows its temperature-programmed solubility. The conditions under which the PVA was manufactured and the characteristics of the PVA are shown in Tables 20 and 21, respectively.

TABLE 8

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.0 | 0.2 | 0.3 | 0.3 | 0.4 | 1.0 | 11.8 | 54 | 100 |

EXAMPLE 8

A white, porous, and granular PVA was obtained in the same manner as in Example 1. However, 166 g of methanol and 150 g of ethylene glycol together with 86 g of PVAc having a polymerization degree of 2000 were put into the autoclave. The addition of the ethylene glycol increases the dielectric constant of the liquid mixture. The water content of this liquid mixture was 1000 ppm. After the sodium methoxide was introduced into the autoclave under pressure, the molar amount of the methanol contained in this liquid mixture was 5.2 times the molar amount of ester groups included in the PVAc. Thereafter, the same operation as in Example 1 was employed. After the liquid reaction mixture was dried, 43.9 g of PVA were obtained. The liquid reaction mixture had a dielectric constant of 36 at the time the reaction started and that of 29 at the time the reaction was stopped. The methyl acetate accounted for 21 wt % of the liquid portion.

The granular PVA thus obtained was subjected to the same measurements of characteristics as in Example 1. Table 9 shows its temperature-programmed solubility. The conditions under which the PVA was manufactured and the characteristics of the PVA are shown in Tables 20 and 21, respectively.

TABLE 9

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.0 | 0.2 | 0.2 | 0.2 | 0.3 | 0.7 | 9.9 | 41 | 100 |

EXAMPLE 9

A white, porous, and granular PVA was obtained in the same manner as in Example 1. However, 4 g of methanol containing 0.24 g of sodium hydroxide (6 mmol, which is 0.006 times the molar amount of ester groups included in the PVAc) instead of sodium methoxide were introduced into the autoclave under pressure using nitrogen to start the reaction. The temperature was raised at the same rate (about 10° C./min) as in Example 1. Consequently, the liquid reaction mixture became cloudy at 100° C. five minutes after the introduction of the sodium hydroxide. Thereafter, as in Example 1, the temperature was raised to 125° C. and the reaction was continued for 15 minutes. Acetic acid then was introduced thereinto under pressure to stop the reaction. After the liquid reaction mixture was dried, 43.4 g of PVA were obtained. The liquid reaction mixture had a dielectric constant of 32 at the time the reaction started and that of 26 at the time the reaction was stopped. The concentration of the methyl acetate contained in the liquid portion of the liquid reaction mixture was the same as that obtained in Example 1.

The granular PVA thus obtained was subjected to the same measurements of characteristics as in Example 1. Table 10 shows its temperature-programmed solubility. The conditions under which the PVA was manufactured and the characteristics of the PVA are shown in Tables 20 and 21, respectively.

TABLE 10

| Temperature (° C.) | 20 | 30 | 40 | 50 | 60 | 70 | 80 | 90 |
|---|---|---|---|---|---|---|---|---|
| Amount of Dissolved PVA (wt %) | 0.0 | 0.0 | 0.0 | 0.1 | 0.2 | 0.9 | 7.9 | 100 |

EXAMPLE 10

A white, porous, and granular PVA was obtained in the same manner as in Example 1. However, 316 g of ethanol were put into the autoclave, instead of methanol, together with 86 g of PVAc having a polymerization degree of 2000. The water content of this liquid mixture was 700 ppm. After the sodium methoxide was introduced into the autoclave under pressure, the molar amount of ethanol contained in this liquid mixture was 7.0 times the molar amount of ester groups included in the PVAc. The temperature was raised at the same rate (about 10° C./min) as in Example 1. Consequently, the liquid reaction mixture became cloudy at 120° C. seven minutes after the introduction of the sodium methoxide. Thereafter, as in Example 1, the temperature was raised to 125° C. and the reaction was continued for 15 minutes. Acetic acid then was introduced thereinto under pressure to stop the reaction. After the liquid reaction mixture was dried, 43.5 g of PVA were obtained. The liquid reaction mixture had a dielectric constant of 26 at the time the reaction started and that of 22 at the time the reaction was stopped. The ethyl acetate accounted for 24 wt % of the liquid portion.

The granular PVA thus obtained was subjected to the same measurements of characteristics as in Example 1. Table 11 shows its temperature-programmed solubility. The conditions under which the PVA was manufactured and the characteristics of the PVA are shown in Tables 20 and 21, respectively.

TABLE 11

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.0 | 0.0 | 0.1 | 0.2 | 0.2 | 0.4 | 7.5 | 46 | 100 |

EXAMPLE 11

First, 238 g of methanol, 24 g of methyl acetate, and 0.093 g of sodium methoxide were put into a 1-liter autoclave provided with an electromagnetic stirrer. The temperature inside the autoclave was adjusted to 100° C. While the liquid mixture was stirred at 1000 rpm, a methanol solution containing 30 wt % of PVAc (having a polymerization degree of 2000) with a saponification degree of 20 mol % and a methanol solution containing 1 wt % of sodium methoxide, which were prepared separately, were put thereinto at a rate of 3 g/min and 0.25 g/min, respectively. While this was allowed to react at 100° C., the reactant was collected continuously. Thus, a granular PVA was obtained. The average residence time was eight hours. In this case, the water content of the liquid reaction mixture was 600 ppm, the mole ratios of a catalyst and methanol to ester groups of the PVAc supplied in this example were 0.0055 and 8.8, respectively. The liquid portion of the liquid reaction mixture collected continuously that was obtained by excluding the PVAc and PVA therefrom had a dielectric constant of 27. The PVA thus obtained was dried at 100° C. for four hours and thereby PVA granules were obtained.

The granular PVA thus obtained was subjected to the same measurements of characteristics as in Example 1. Table 12 shows its temperature-programmed solubility. The conditions under which the PVA was manufactured and the characteristics of the PVA are shown in Tables 20 and 21, respectively.

TABLE 12

| Temperature (° C.) | 20 | 30 | 40 | 50 | 60 | 70 | 80 | 85 | 90 |
|---|---|---|---|---|---|---|---|---|---|
| Amount of Dissolved PVA (wt %) | 0.5 | 0.7 | 1.0 | 1.2 | 2.5 | 3.3 | 9.1 | 50 | 100 |

COMPARATIVE EXAMPLE 3

In this comparative example, 730 g of a liquid mixture consisting of 10 wt % of methyl acetate and 90 wt % of methanol, and 56 g of methanol solution containing 5.6 g of sodium methoxide were put into a 3-liter separable flask. The temperature thereof was adjusted to 45° C. While this was stirred to be uniform, a mixed solution containing of 30 wt % of PVA (having a polymerization degree of 2000) with a saponification degree of 20 mol %, 7 wt % of methyl acetate, and 63 wt % of methanol, and a methanol solution containing 10 wt % of sodium methoxide, which were prepared separately, were put thereinto at a rate of 9 g/min and 1.5 g/min, respectively. The reactant then was collected continuously. Thus, a granular PVA was obtained. -The average residence time was eight hours. The PVA thus obtained was dried at 100° C. for four hours and thereby PVA granules were obtained.

The granular PVA thus obtained was subjected to the same measurements of characteristics (except for the bulk specific gravity and mean grain diameter) as in Example 1. Table 13 shows its temperature-programmed solubility. The conditions under which the PVA was manufactured and the characteristics of the PVA are shown in Tables 20 and 21, respectively.

TABLE 13

| Temperature (° C.) | 20 | 30 | 40 | 50 | 60 | 65 | 70 | 80 | 90 |
|---|---|---|---|---|---|---|---|---|---|
| Amount of Dissolved PVA (wt %) | 1.0 | 1.6 | 1.6 | 2.2 | 2.8 | 12.8 | 34 | 88 | 97 |

COMPARATIVE EXAMPLE 4

In this comparative example, 35 wt % of PVAc with a polymerization degree of 2000, 65 wt % of methanol (containing 0.1% water), and sodium hydroxide (with a mole ratio of 0.001) were put into a reactor provided with a stirring blade to be mixed together. This was saponified at 40° C. for 60 minutes. Thereafter, acetic acid was added thereto to stop the saponification reaction and thereby a methanol solution of partially saponified PVA (A) with a saponification degree of 41.0 mol % was obtained. The partially saponified PVA (A) methanol solution and a liquid mixture consisting of 35 wt % of unsaponified PVAc (B) and 65 wt % of methanol were mixed together at a mixture ratio by weight of 45 : 55 in terms of solid contents. The temperature thereof was adjusted to 50° C. The mixed solution and a methanol solution of sodium hydroxide (with a mole ratio of 0.01) were put into a continuous instantaneous mixer individually and the mixture thereof was collected continuously. The average residence time was two seconds. Subsequently, the mixture was allowed to stand still in the reactor at 50° C. for 20 minutes to undergo an alcoholysis reaction. Thus, a gel PVA was obtained. The gel PVA was pulverized and then was dried at 100° C. for four hours. Thus, PVA powder was obtained.

The PVA granules thus obtained were subjected to the same measurements of characteristics (except for the bulk specific gravity and mean grain diameter) as in Example 1. Table 14 shows their temperature-programmed solubility. The conditions under which the PVA was manufactured and the characteristics of the PVA are shown in Tables 20 and 21, respectively.

TABLE 14

| Temperature (° C.) | 20 | 30 | 40 | 50 | 60 | 70 | 80 | 90 |
|---|---|---|---|---|---|---|---|---|
| Amount of Dissolved PVA (wt %) | 3.0 | 6.8 | 17 | 38 | 86 | 100 | 100 | 100 |

COMPARATIVE EXAMPLE 5

A mixed solution consisting of 35 wt % of PVAc with a polymerization degree of 2000, 65 wt % of methanol, and 0.3 wt % of sodium hydroxide (the molar amounts of methanol and sodium hydroxide were 5.0 times and 0.018 times the molar amount of ester groups included in the PVAc, respectively, and the water contained in the liquid mixture was measured and was 2100 ppm) was supplied to a belt conveyer for belt saponification whose temperature was maintained at 45° C. to be saponified on the belt for 20 minutes. A block PVA thus obtained was pulverized and then was washed with methanol. Thereafter, it was dried at 100° C. for four hours. Thus, PVA powder was obtained.

The PVA granules thus obtained were subjected to the same measurements of characteristics (except for the bulk specific gravity and mean grain diameter) as in Example 1. Table 15 shows their temperature-programmed solubility. The conditions under which the PVA was manufactured and the characteristics of the PVA are shown in Tables 20 and 21, respectively.

TABLE 15

| Temperature (° C.) | 20 | 30 | 40 | 50 | 60 | 70 | 80 | 90 |
|---|---|---|---|---|---|---|---|---|
| Amount of Dissolved PVA (wt %) | 7.0 | 11 | 18 | 36 | 83 | 100 | 100 | 100 |

EXAMPLE 12

A white, porous, and granular PVA was obtained in the same manner as in Example 1. However, 86 g of PVAc with a polymerization degree of 200 and 204 g of methanol were put into the autoclave in this example. The water content of this liquid mixture was 950 ppm. The temperature was raised to 55° C. as in Example 1. Thereafter, 4 g of methanol containing 0.216 g of sodium methoxide (4 mmol, which is 0.004 times the molar amount of ester groups included in the PVAc) were introduced into the autoclave under pressure using nitrogen. After the sodium methoxide was introduced, the molar amount of methanol contained in this liquid mixture was 6.5 times the molar amount of ester groups included in the PVAc. The temperature was raised at the same rate (about 10° C./min) as in Example 1. Consequently, the liquid reaction mixture became cloudy at 110° C. six minutes after the introduction of the sodium methoxide. Thereafter, as in Example 1, the temperature was raised to 125° C. and the reaction was continued for 15 minutes. Acetic acid then was introduced thereinto under pressure to stop the reaction. The amount of the acetic acid introduced thereinto was 0.6 g. After the liquid reaction mixture was dried, 43.7 g of PVA were obtained. The liquid reaction mixture had a dielectric constant of 32 at the time the reaction started and that of 24 at the time the reaction was stopped. The concentration of the methyl acetate measured after the reaction was stopped was the same as that obtained in Example 1.

The granular PVA thus obtained was subjected to the same measurements of characteristics as in Example 1. Table 16 shows its temperature-programmed solubility. The conditions under which the PVA was manufactured and the characteristics of the PVA are shown in Tables 20 and 21, respectively.

TABLE 16

| Temperature (° C.) | 20 | 30 | 40 | 50 | 60 | 65 | 70 | 80 | 90 |
|---|---|---|---|---|---|---|---|---|---|
| Amount of Dissolved PVA (wt %) | 1.0 | 1.8 | 2.7 | 5.8 | 9.0 | 12 | 20 | 61 | 100 |

EXAMPLE 13

A white, porous, and granular PVA was obtained in the same manner as in Example 1. However, 86 g of PVAc with a polymerization degree of 200 and 252 g of methanol were put into the autoclave in this example. The water content of this liquid mixture was 920 ppm. The temperature was raised to 55° C. as in Example 1. Thereafter, 4 g of methanol containing 0.27 g of sodium methoxide (5 mmol, which is 0.005 times the molar amount of ester groups included in the PVAc) were introduced into the autoclave under pressure using nitrogen. After the sodium methoxide was introduced, the molar amount of methanol contained in this liquid mixture was eight times the molar amount of ester groups included in the PVAc. The temperature was raised at the same rate (about 10° C./min) as in Example 1. Consequently, the liquid reaction mixture became cloudy at 110° C. six minutes after the introduction of the sodium methoxide. Thereafter, as in Example 1, the temperature was raised to 125° C. and the reaction was continued for 15 minutes. Acetic acid then was introduced thereinto under pressure to stop the reaction. The amount of the acetic acid introduced under pressure was 0.83 g. After the liquid reaction mixture was dried, 27.5 g of PVA were obtained. The acquisition amount of granular PVA that is calculated from the saponification degree corresponds to 57% of the theoretical amount calculated based on the used PVAc. The liquid reaction mixture had a dielectric constant of 32 at the time the reaction started and that of 25 at the time the reaction was stopped. The concentration of the methyl acetate measured after the reaction was stopped was the same as that obtained in Example 1.

The granular PVA thus obtained was subjected to the same measurements of characteristics as in Example 1. Table 17 shows its temperature-programmed solubility. The conditions under which the PVA was manufactured and the characteristics of the PVA are shown in Tables 20 and 21, respectively.

TABLE 17

| Temperature (° C.) | 20 | 30 | 40 | 50 | 60 | 70 | 80 | 90 |
|---|---|---|---|---|---|---|---|---|
| Amount of Dissolved PVA (wt %) | 48 | 84 | 92 | 95 | 98 | 99 | 100 | 100 |

EXAMPLE 14

A white, porous, and granular PVA was obtained in the same manner as in Example 1. However, 87.3 g of PVAc with a polymerization degree of 200 that had been modified with 2 mol % of itaconic acid, 200 g of methanol, and 38 g of methyl acetate were put into the autoclave in this example. The water content of this liquid mixture was 910 ppm. The temperature was raised to 55° C. as in Example 1. Thereafter, 18 g of methanol containing 2.54 g of sodium methoxide (47 mmol, which is 0.048 times the molar amount of ester groups included in the PVAc) were introduced into the autoclave under pressure using nitrogen. After the sodium methoxide was introduced, the molar amount of methanol contained in this liquid mixture was 0.048 times the molar amount of ester groups included in the PVAc. The temperature was raised at the same rate (about 10° C./min) as in Example 1. Consequently, the liquid reaction mixture became cloudy at 100° C. five minutes after the introduction of the sodium methoxide. Thereafter, as in Example 1, the temperature was raised to 125° C. and the reaction was continued for 15 minutes. Acetic acid then was introduced under pressure to stop the reaction. The amount of the acetic acid introduced under pressure was 5 g (83 mmol). After the liquid reaction mixture was dried, 40.8 g of PVA were obtained. The liquid reaction mixture had a dielectric constant of 27 at the time the reaction started and that of 22 at the time the reaction was stopped. The ethyl acetate accounted for 37 wt % of the liquid portion.

The granular PVA thus obtained was subjected to the same measurements of characteristics as in Example 1. Table 18 shows its temperature-programmed solubility. The conditions under which the PVA was manufactured and the characteristics of the PVA are shown in Tables 20 and 21, respectively.

TABLE 18

| Temperature (° C.) | 20 | 30 | 40 | 50 | 60 | 70 | 80 | 90 |
|---|---|---|---|---|---|---|---|---|
| Amount of Dissolved PVA (wt %) | 30 | 88 | 98 | 99 | 100 | 100 | 100 | 100 |

EXAMPLE 15

A white, porous, and granular PVA was obtained in the same manner as in Example 1. However, 80.8 g of PVAc with a polymerization degree of 200 that had been modified with 9 mol % of ethylene and 316 g of methanol were put into the autoclave in this example. The water content of this liquid mixture was 900 ppm. The temperature was raised to 55° C. as in Example 1. Thereafter, 4 g of methanol containing 0.162 g of sodium methoxide (3 mmol, which is 0.0035 times the molar amount of ester groups included in the PVAc) were introduced into the autoclave under pressure using nitrogen. After the sodium methoxide was introduced, the molar amount of methanol contained in this liquid mixture was 11.7 times the molar amount of ester groups included in the PVAc. The temperature was raised at the same rate (about 10° C./min) as in Example 1. Consequently, the liquid reaction mixture became cloudy at 120° C. seven minutes after the introduction of the sodium methoxide. Thereafter, as in Example 1, the temperature was raised to 125° C. and the reaction was continued for 15 minutes. Acetic acid then was introduced under pressure to stop the reaction. After the liquid reaction mixture was dried, 42.6 g of PVA were obtained. The concentration of methyl acetate measured after the reaction was stopped was the same as that obtained in Example 1.

The granular PVA thus obtained was subjected to the same measurements of characteristics as in Example 1. Table 19 shows its temperature-programmed solubility. The conditions under which the PVA was manufactured and the characteristics of the PVA are shown in Tables 20 and 21, respectively.

TABLE 19

| Temperature (° C.) | 20 | 30 | 40 | 50 | 60 | 70 | 80 | 90 |
|---|---|---|---|---|---|---|---|---|
| Amount of Dissolved PVA (wt %) | 2.4 | 2.8 | 3.6 | 4.8 | 6.0 | 10 | 36 | 97 |

TABLE 20-1

| | Reaction Method | Polymerization Degree | Water Content (ppm) | Temperature of Liquid Mixture (° C.) Start→Precipitation→End |
|---|---|---|---|---|
| Example 1 | Batch | 2000 | 760 | 55→110→125 |
| Example 2 | Batch | 2000 | 760 | 125→125→125 |
| Example 3 | Batch | 2000 | 760 | 35→90→125 |
| Example 4 | Batch | 2000 | 760 | 168→135→135 |
| Example 5 | Batch | 2000 | 760 | 55→110→70 |
| Example 6 | Batch | 2000 | 760 | 55→110→155 |
| Example 7 | Batch | 2000 | 600 | 55→120→125 |
| Example 8 | Batch | 2000 | 1000 | 55→110→125 |
| Example 9 | Batch | 2000 | 760 | 55→100→125 |
| Example 10 | Batch | 2000 | 700 | 55→120→125 |
| Example 11 | Continuous | 2000 | 600 | 100 |
| Example 12 | Batch | 200 | 950 | 55→110→125 |
| Example 13 | Batch | 200 | 920 | 55→110→125 |
| Example 14 | Batch | 200 | 910 | 55→100→125 |
| Example 15 | Batch | 500 | 900 | 55→120→125 |
| C. Ex. 1 | Batch | 2000 | 760 | 55→70→125 |
| C. Ex. 2 | Batch | 2000 | 760 | 155→155→155 |
| C. Ex. 3 | Continuous | 2000 | | 45 |
| C. Ex. 4 | | 2000 | | 50 |
| C. Ex. 5 | Belt | 2000 | 2100 | 45 |

* In the table above, the abbreviation "C. Ex." denotes Comparative Example.

TABLE 20-2

| | Dielectric Constant Start→End | Catalyst Quantity (mole times/ to ester) | Alcohol Amount (mole times/ to ester) | Remarks |
|---|---|---|---|---|
| Example 1 | 32→26 | 0.003 | 10 | Basic Condition of Temperature Rise |
| Example 2 | 32→26 | 0.002 | 10 | Constant at 125° C. |
| Example 3 | 32→26 | 0.005 | 10 | Start at 35° C. |
| Example 4 | 32→26 | 0.003 | 10 | Start at 168° C. |
| Example 5 | 32→26 | 0.003 | 10 | End at 70° C. |
| Example 6 | 32→26 | 0.003 | 10 | End at 155° C. |
| Example 7 | 23→18 | 0.003 | 6.3 | Dielectric Constant Decreased |
| Example 8 | 36→29 | 0.003 | 5.2 | Dielectric Constant Increased |
| Example 9 | 32→26 | 0.006 | 10 | NaOH Catalyst |
| Example 10 | 26→22 | 0.003 | 7.0 | Ethanol |
| Example 11 | 27 | 0.0055 | 8.8 | Continuous Method, 100° C. |
| Example 12 | 32→24 | 0.004 | 6.5 | Polymerization Degree of 200 |
| Example 13 | 32→25 | 0.005 | 8 | Polymerization Degree of 200 |
| Example 14 | 27→22 | 0.048 | 7.0 | Modified with Itaconic Acid |
| Example 15 | 32→26 | 0.0035 | 7.7 | Modified with Ethylene |
| C. Ex. 1 | 32→26 | 0.03 | 10 | Precipitation at 70° C. |
| C. Ex. 2 | 32→26 | 0.003 | 10 | Constant at 155° C. |
| C. Ex. 3 | | | | Continuous Method, Low Temperature |
| C. Ex. 4 | | | | |
| C. Ex. 5 | | 0.018 | 5.0 | Belt Saponification Method |

* In the table above, the abbreviation "C. Ex." denotes Comparative Example.

TABLE 21-1

| | Saponification Degree (%) | Amount of Volatile Organic Compounds (wt %) | Amount of Remaining Na (ppm) | Pore Volume (cc/g) |
|---|---|---|---|---|
| Example 1 | 99.32 | <0.1 | 350 | 0.82 |
| Example 2 | 99.45 | <0.1 | 390 | 0.73 |
| Example 3 | 99.33 | <0.1 | 400 | 0.79 |
| Example 4 | 99.23 | <0.1 | 1500 | 0.35 |

TABLE 21-1-continued

|  | Saponification Degree (%) | Amount of Volatile Organic Compounds (wt %) | Amount of Remaining Na (ppm) | Pore Volume (cc/g) |
|---|---|---|---|---|
| Example 5 | 99.21 | <0.1 | 380 | 0.66 |
| Example 6 | 99.66 | <0.1 | 1350 | 0.37 |
| Example 7 | 99.10 | <0.1 | 885 | 0.40 |
| Example 8 | 99.28 | <0.1 | 1420 | 0.30 |
| Example 9 | 98.22 | <0.1 | 500 | 0.62 |
| Example 10 | 99.32 | <0.1 | 390 | 0.70 |
| Example 11 | 99.14 | <0.1 | 300 | 0.68 |
| Example 12 | 99.20 | <0.1 | 450 | 0.36 |
| Example 13 | 90.11 | <0.1 | 400 | 0.39 |
| Example 14 | 90.39 | <0.1 | 1860 | 0.26 |
| Example 15 | 98.22 | <0.1 | 120 | 0.38 |
| C. Ex. 1 | 99.30 | <0.1 | 1000 | 0.57 |
| C. Ex. 2 | 94.70 | <0.1 | 3000 | 0.10 |
| C. Ex. 3 | 99.42 | <0.1 | 3500 | 0.56 |
| C. Ex. 4 | 98.41 | <0.1 | 2900 | 0.15 |
| C. Ex. 5 | 96.30 | 1.6 | 5200 | 0.02 |

* In the table above, the abbreviation "C. Ex." denotes Comparative Example.

TABLE 21-2

|  | Bulk Specific Gravity (g/cc) | Mean Grain Diameter (μm) | Solubility in Water (Temperature: ° C./wt %) |
|---|---|---|---|
| Example 1 | 0.38 | 855 | 80° C./6.7, 85° C./38→90° C./100 |
| Example 2 | 0.40 | 750 | 80° C./9.5, 85° C./42→90° C./100 |
| Example 3 | 0.31 | 890 | 80° C./11.5, 85° C./57→90° C./100 |
| Example 4 | 0.51 | 950 | 80° C./9.7, 85° C./45→90° C./100 |
| Example 5 | 0.29 | 950 | 80° C./11.8, 85° C./65→90° C./100 |
| Example 6 | 0.45 | 897 | 80° C./8.9, 85° C./44→90° C./100 |
| Example 7 | 0.40 | 215 | 80° C./11.8, 85° C./54→90° C./100 |
| Example 8 | 0.53 | 1090 | 80° C./9.9, 85° C./41→90° C./100 |
| Example 9 | 0.29 | 1220 | 80° C./7.9→90° C./100 |
| Example 10 | 0.30 | 953 | 80° C./7.5, 85° C./46→90° C./100 |
| Example 11 | 0.41 | 880 | 80° C./9.1, 85° C./50→90° C./100 |
| Example 12 | 0.38 | 409 | 60° C./9.0, 65° C./12→90° C./100 |
| Example 13 | 0.39 | 233 | 20° C./48, 30° C./84 |
| Example 14 | 0.35 | 284 | 20° C./30, 30° C./88 |
| Example 15 | 0.31 | 639 | 70° C./10→90° C./97 |
| C. Ex. 1 | 0.30 | 1100 | 70° C./16.2, 80° C./21.5→90° C./100 |
| C. Ex. 2 |  |  |  |
| C. Ex. 3 |  |  | 65° C./12.8, 70° C./34→80° C./88 |
| C. Ex. 4 |  |  | 40° C./17→60° C./86 |
| C. Ex. 5 |  |  | 40° C./18→60° C./83 |

* In the table above, the abbreviation "C. Ex." denotes Comparative Example.

The present invention allows a PVA with excellent characteristics to be manufactured industrially without using any additional processes.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polyvinyl alcohol based polymer, which is one that satisfies one of the following conditions (1) to (4):

(1) its polymerization degree is at least 800 but lower than 8000, its saponification degree is at least 99.0 mol %, and a difference between a temperature at which its temperature-programmed solubility in water becomes lower than 15 wt % and a temperature at which its temperature-programmed solubility in water becomes at least 90 wt % is 10° C. or less and wherein its temperature-programmed solubility in water is lower than 15 wt % at 80° C. and is at least 90 wt % at 90° C.;

(2) its polymerization degree is at least 800 but lower than 8000, its saponification degree is at least 80.0 mol % but lower than 99.0 mol %, and a difference between a temperature at which its temperature-programmed solubility in water becomes lower than 15 wt % and a temperature at which its temperature-programmed solubility in water becomes at least 90 wt % is 20° C. or less and wherein its temperature-programmed solubility in water is lower than 15 wt % at 80° C. and is at least 90 wt % at 90° C.;

(3) its polymerization degree is at least 120 but lower than 800, its saponification degree is at least 95.0 mol %, its temperature-programmed solubility in water is lower than 40 wt % at 50° C., and a difference between a temperature at which its temperature-programmed solubility in water becomes lower than 15 wt % and a temperature at which its temperature-programmed solubility in water becomes at least 90 wt % is 30° C. or less; and (4) its polymerization degree is at least 120 but lower than 800, its saponification degree is at least 80.0 mol % but lower than 95.0 mol %, and its temperature-programmed solubility in water is lower than 50 wt % at 20° C., wherein the temperature-programmed solubility in water denotes a numerical value that is determined by a formula of $(S1/52) \times 100$ (wt %), where S1 denotes an amount of a polyvinyl alcohol based polymer dissolved at a predetermined temperature when a predetermined amount of the polyvinyl alcohol based polymer is put into water whose temperature is 20° C. to prepare a suspension so that the predetermined amount corresponds to 4 wt % of the whole, and then temperature of the suspension is raised to the predetermined temperature at a rate of 0.8° C./min while the suspension is stirred, and S2 denotes the predetermined amount of the polyvinyl alcohol based polymer.

2. The polyvinyl alcohol based polymer according to claim 1, wherein a pore volume of pores with a mean diameter of 0.01 μm to 10 μm is in the range of 0.2 cc/g to 1.0 cc/g.

3. The polyvinyl alcohol based polymer according to claim 1, comprising 0.5 wt % or less of a volatile organic compound whose boiling point is 200° C. or lower.

4. The polyvinyl alcohol based polymer according to claim 1, comprising 2500 ppm or less of alkali metal salt in terms of weight of alkaline metal ions.

5. The polyvinyl alcohol based polymer according to claim 1, wherein the polyvinyl alcohol based polymer has an arithmetic mean grain diameter of 100 μm to 2000 μm.

6. The polyvinyl alcohol based polymer according to claim 1, wherein the polyvinyl alcohol based polymer has a bulk specific gravity of 0.20 to 0.60.

7. The polyvinyl alcohol based polymer according to claim 1, that satisfies condition (1).

8. The polyvinyl alcohol based polymer according to claim 1, that satisfies condition (2).

9. The polyvinyl alcohol based polymer according to claim 1, that satisfies condition (3).

10. The polyvinyl alcohol based polymer according to claim 1, that satisfies condition (4).

11. A method of manufacturing the polyvinyl alcohol based polymer of claim 1, comprising:
  conducting a transesterification reaction of a polyvinyl ester based polymer with alcohol in a liquid reaction mixture comprising the polyvinyl ester based polymer, the alcohol, and a basic compound;
  precipitating the polyvinyl ester based polymer, at least a part of which has been transesterified with the alcohol, out of the liquid reaction mixture; and
  further conducting the transesterification reaction in the liquid reaction mixture comprising the polyvinyl ester based polymer that has precipitated,
  wherein the liquid reaction mixture has a temperature of 75° C. to 150° C. when the polyvinyl ester based polymer, at least a part of which has been transesterified, starts precipitating.

12. The method according to claim 11, wherein the liquid reaction mixture has a temperature of 40° C. to 165° C. from the start of the transesterification reaction to the start of precipitation of the polyvinyl ester based polymer.

13. The method according to claim 11, wherein the liquid reaction mixture has a temperature of 75° C. to 150° C. from the start of precipitation of the polyvinyl ester based polymer to the end of the transesterification reaction.

14. The method according to claim 11, wherein a relationship of:

$$145+20\times\exp(-0.05\times A) \geq T \geq 85-45\times\exp(-0.05\times A)$$

is satisfied, where A denotes a transesterification degree (mol%) of the polyvinyl ester based polymer, and T denotes a temperature (° C.) of the liquid reaction mixture.

15. The method according to claim 11, wherein a part of the liquid reaction mixture has a dielectric constant of 20 to 35 at 20° C. while the transesterification reaction is progressing, where the part is obtained by excluding, from the liquid reaction mixture, the polyvinyl alcohol based polymer and the polyvinyl ester based polymer that have dissolved in and have precipitated out of the liquid reaction mixture.

16. The method according to claim 11, wherein a molar amount of the alcohol to be used is at least three times a molar amount of ester groups included in the polyvinyl ester based polymer.

17. The method according to claim 11, wherein the basic compound includes at least one selected from the group consisting of sodium hydroxide, potassium hydroxide, lithium hydroxide, sodium methoxide, potassium methoxide, and sodium ethoxide.

18. The method according to claim 11, wherein the alcohol includes methanol and/or ethanol.

19. The method according to claim 11, wherein a molar amount of the basic compound to be used is 0.0005 to 0.2 times a molar amount of vinyl ester groups included in the polyvinyl ester based polymer.

20. The method according to claim 11, wherein the liquid reaction mixture includes 2 wt % or less of water.

* * * * *